United States Patent
Kim et al.

(10) Patent No.: US 9,136,992 B2
(45) Date of Patent: Sep. 15, 2015

(54) METHOD FOR TRANSMITTING AND RECEIVING UPLINK SIGNAL IN WIRELESS COMMUNICATION SYSTEM

(75) Inventors: Hee Wook Kim, Daejeon (KR); KunSeok Kang, Daegu (KR); Bon Jun Ku, Daejeon (KR); Do-Seob Ahn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 213 days.

(21) Appl. No.: 13/612,740

(22) Filed: Sep. 12, 2012

(65) Prior Publication Data

US 2013/0070698 A1 Mar. 21, 2013

(30) Foreign Application Priority Data

Sep. 16, 2011 (KR) .................. 10-2011-0093639

(51) Int. Cl.
*H04W 72/04* (2009.01)
*H04L 5/00* (2006.01)
*H04W 72/00* (2009.01)
*H04W 84/06* (2009.01)

(52) U.S. Cl.
CPC ............ *H04L 5/0016* (2013.01); *H04L 5/0044* (2013.01); *H04L 5/0048* (2013.01); *H04L 5/0053* (2013.01); *H04W 72/00* (2013.01); *H04W 84/06* (2013.01)

(58) Field of Classification Search
CPC ..... H04W 72/04; H04W 88/08; H04W 76/00; H04W 72/0446; H04W 72/0453; H04W 52/40; H04W 84/12; H04W 84/18; H04B 7/2621; H04B 7/216; H04B 7/212; H04B 7/2123; H04B 7/2121; H04B 7/0617; H04B 7/04
USPC ......... 370/208, 295, 314, 320–321, 329–330, 370/334–336
See application file for complete search history.

(56) References Cited

U.S. PATENT DOCUMENTS

| | | | |
|---|---|---|---|
| 8,913,584 B2* | 12/2014 | Wang et al. .................... | 370/330 |
| 2011/0141941 A1* | 6/2011 | Lee et al. ....................... | 370/252 |
| 2011/0170629 A1* | 7/2011 | Lee et al. ....................... | 375/295 |
| 2011/0286436 A1 | 11/2011 | Suzuki et al. | |
| 2012/0039275 A1* | 2/2012 | Chen et al. ..................... | 370/329 |
| 2013/0315165 A1* | 11/2013 | Suzuki et al. .................. | 370/329 |

FOREIGN PATENT DOCUMENTS

| WO | WO 2010/029413 A1 | 3/2010 |
|---|---|---|
| WO | WO 2010/084901 A1 | 7/2010 |

OTHER PUBLICATIONS

A.B. Awoseyila et al., "Improved time diversity for LTE over satellite using split multicode transmission", Electronics Letters, May 13, 2010, vol. 46, No. 10.

* cited by examiner

*Primary Examiner* — Kwang B Yao
*Assistant Examiner* — Syed M Bokhari

(57) ABSTRACT

First resource blocks of a radio resource each include a first number of subcarriers and a second number of subframes having the first size. In this case, second resource blocks are formed, each second resource block including fewer subcarriers than the first number and fewer subframes than the second number based on the first resource blocks. A signal is transmitted in the first resource block or second resource block, and particularly, signals of first and second channels are transmitted by sharing the first resource block.

17 Claims, 14 Drawing Sheets

METHOD FOR TRANSMITTING AND RECEIVING UPLINK SIGNAL IN WIRELESS COMMUNICATION SYSTEM

CROSS-REFERENCE TO RELATED APPLICATION

This application claims priority to and the benefit of Korean Patent Application No. 10-2011-0093639 filed in the Korean Intellectual Property Office on Sep. 16, 2011, the entire contents of which are incorporated herein by reference.

BACKGROUND OF THE INVENTION (a) Field of the Invention

The present invention relates to a method for signal transmission and reception in a wireless communication system, and more particularly, to a method for transmitting and receiving an uplink signal in a wireless communication system.

(b) Description of the Related Art

For long term evolution (LTE) uplink transmission, single-carrier transmission based on discrete Fourier transform spread-orthogonal frequency division multiplexing (DFTS-OFDM) is used. The use of single-carrier transmission in the uplink is motivated by the lower peak-to-average power ratio (PAPR) compared to multi-carrier transmission such as OFDM. The smaller the peak-to-average ratio of a transmitted signal, the higher the average transmission power can be for a given power amplifier. Single-carrier transmission therefore allows for more efficient usage of the power amplifier, which translates into increased coverage and reduced terminal power consumption.

In contrast to the non-orthogonal wideband code division multiple access/high speed packet access (WCDMA/HSPA), which is also based on single-carrier transmission, the LTE uplink is based on orthogonal separation of uplink transmissions in the time and/or frequency domain. Orthogonal user separation is beneficial as it avoids intra-cell interference in many cases. However, allocating a very large instantaneous bandwidth resource for uplink transmission from a single terminal is not an efficient strategy in situations where the data rate is mainly limited by the available terminal transmission power rather than bandwidth. In such situations, a terminal is instead allocated only a part of the total available bandwidth and other terminals can transmit in parallel on the remaining part of the spectrum. Thus, as the LTE uplink contains a frequency-domain multiple-access component, the LTE uplink transmission scheme is sometimes also referred to as single carrier frequency division multiple access (SC-FDMA).

In a wireless communication system based on a satellite radio interface using the SC-FDMA transmission scheme, high-power signal transmission is required due to a low link margin. A basic transport block for the uplink in LTE has a size of 180 kHz, which has the drawback that, in consideration of the low peak transmission power level of a handheld-type terminal, the power allocated in each subcarrier of the basic transport block does not provide transmission power that satisfies the link margin of a satellite radio communication system.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a method for signal transmission and reception having the advantage of providing sufficient transmission power to each subcarrier for uplink transmission in a wireless communication system based on a satellite radio interface.

Furthermore, the present invention provides a method for signal transmission and reception for narrowband transmission which provides sufficient transmission power to each subcarrier of a terminal while maintaining compatibility with the existing satellite radio interface.

An exemplary embodiment of the present invention provides a method for transmitting a signal through an uplink radio resource consisting of resource blocks, each including a plurality of subcarriers, the method including: if a first data signal of a first channel is transmitted through a resource block, encoding a second data signal of a second channel by using a first sequence; additionally encoding the second data signal of the second channel encoded using the first sequence by using a second sequence; and transmitting the additionally encoded second data signal in the resource block.

The first sequence may be a phase-rotated sequence of a first length used for transmission of the first data signal, and the second sequence may be an orthogonal sequence for transmission in the same resource block as the first channel. Alternatively, the first sequence may be an orthogonal sequence for transmission in the same resource block as the first channel, and the first sequence may be a phase-rotated sequence of length 1 used for transmission of the first data signal.

In this case, the first length of the phase-rotated sequence used for transmission of the first data signal corresponds to the number of subcarriers included in the resource block. The second data signal is encoded by multiplying the signal by a sequence corresponding to the index of a subcarrier used by the second channel, among phase-rotated sequences of the first length.

Another embodiment of the present invention provides a signal transmission method including: if first resource blocks of a radio resource each include a first number of subcarriers and a second number of subframes having the first size, forming second resource blocks each including fewer subcarriers than the first number and fewer subframes than the second number based on the first resource blocks; and transmitting a signal in the first resource block or second resource block.

A transmission frame may include the first resource block and the second resource block.

In this case, a signal of a first channel may be transmitted in the first resource block, and a signal of a second channel for narrowband transmission may be transmitted in the second resource block.

The signal of the first channel and the signal of the second channel for narrowband transmission may be transmitted in the first resource block.

In the signal transmission method having these characteristics, if the first number of first resource blocks is 12 and the second number of first resource blocks is 1, the number of subcarriers of the second resource block may be one of 2, 3, 4, and 6, and the number of subframes of the second resource block may be one of 6, 4, 3, and 2.

Yet another embodiment of the present invention provides a method for receiving a signal through an uplink radio resource consisting of resource blocks each including a plurality of subcarriers, the method including: decoding a data signal received in a resource block by using a first sequence; detecting a first channel from the signal encoded using the first sequence to acquire a first data signal; decoding the signal decoded using the first sequence by using a second sequence; and detecting a second channel from the signal decoded using the second sequence to acquire a second data signal.

The first sequence may be a phase-rotated sequence of the first length used for transmission of the first data signal, and the second sequence may be an orthogonal sequence for transmission in the resource block.

DETAILED DESCRIPTION OF THE EMBODIMENTS

Figure 1:
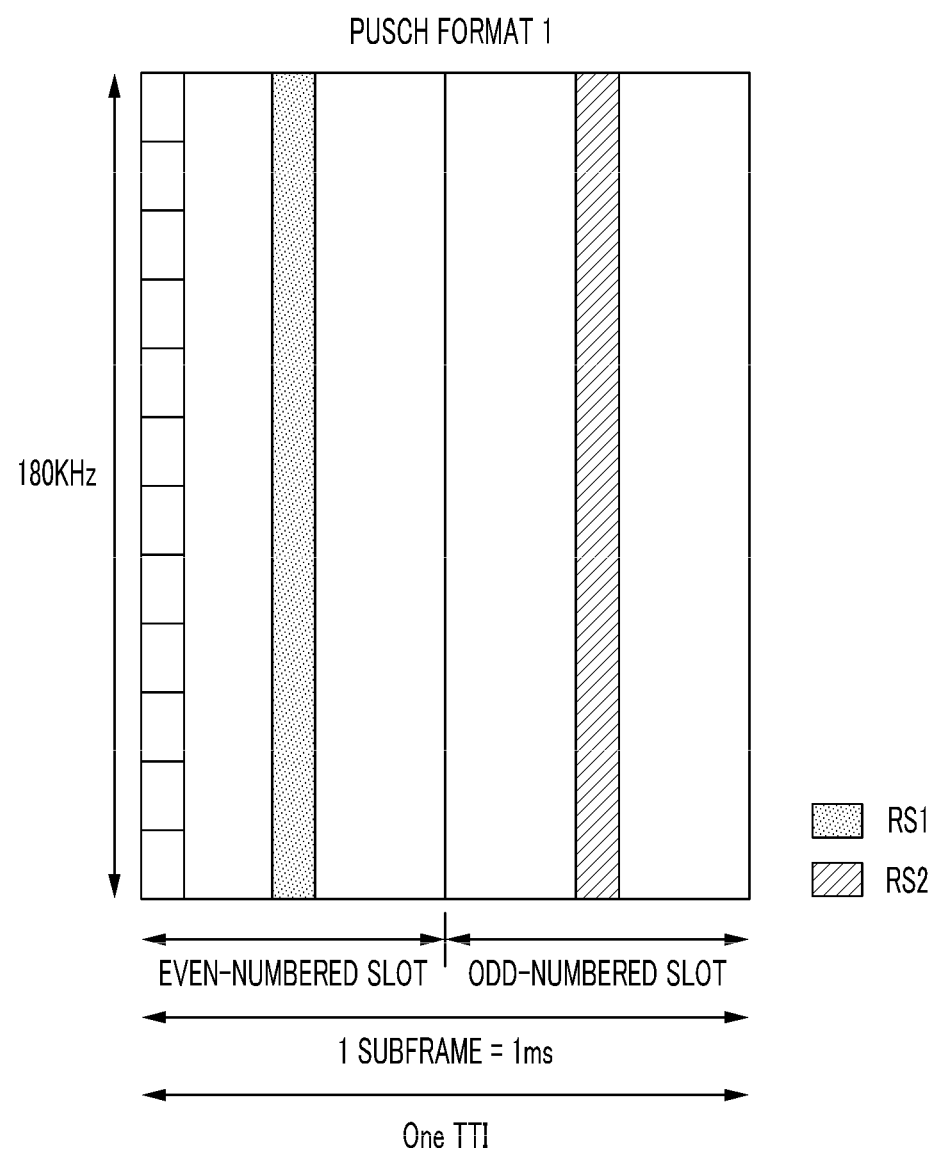
FIG. 1 is a view showing a channel structure for signal transmission in a wireless communication system.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

A terminal may refer to a mobile station (MS), a subscriber station (SS), a portable subscriber station (PSS), user equipment (UE), an access terminal (AT), etc., and may include all or part of the functions of the mobile terminal, the subscriber station, the portable subscriber station, the user equipment, etc.

A base station (BS) may refer to a node B, an access point (AP), a radio access station (RAS), a base transceiver station (BTS), an MMR (mobile multihop relay)-BS, etc., and may include all or part of the functions of the access point, the radio access station, the node B, the base transceiver station, the MMR-BS, etc.

Hereinafter, a method and apparatus for transmitting an uplink signal in a wireless communication system according to an exemplary embodiment of the present invention will be described with reference to the drawings.

A radio resource for signal transmission based on a satellite radio interface according to an exemplary embodiment of the present invention includes a plurality of transport blocks, and each transport block includes a plurality of subcarriers and a plurality of symbols. Each transport block consists of, for example, 12 subcarriers with bandwidth of 15 kHz and 7 or 6 symbols.

For signal transmission according to an exemplary embodiment of the present invention, the transport block size and the bandwidth (e.g., 15 kHz) of each subcarrier are not changed in order to maintain as much compatibility with the existing radio interface (e.g., LTE radio interface) as possible. As the bandwidth of each subcarrier is not changed, the transmission parameters and chipset of the existing radio interface can be re-used as it is in the exemplary embodiment of the present invention. Moreover, a signal transmitting apparatus for the existing radio interface can be used as it is because the transport block size is not changed. A multiplexing and encoding method for the existing radio interface can therefore be used as it is. That is, the existing radio interface is not changed at the MAC layer or higher layers, except for physical layer modifications.

In the exemplary embodiment of the present invention, the number of OFDM symbols allocated to a transport block is increased as much as the number of subcarriers allocated to the transport block is decreased, in order to make the transport block size equal to that for the existing radio interface and perform narrowband signal transmission according to the exemplary embodiment of the present invention. That is, the transport block size is made equal to the block size for the existing radio interface by increasing the length of a transmission time interval (TTI) by as much as the decrease in the number of subcarriers.

Figure 2:
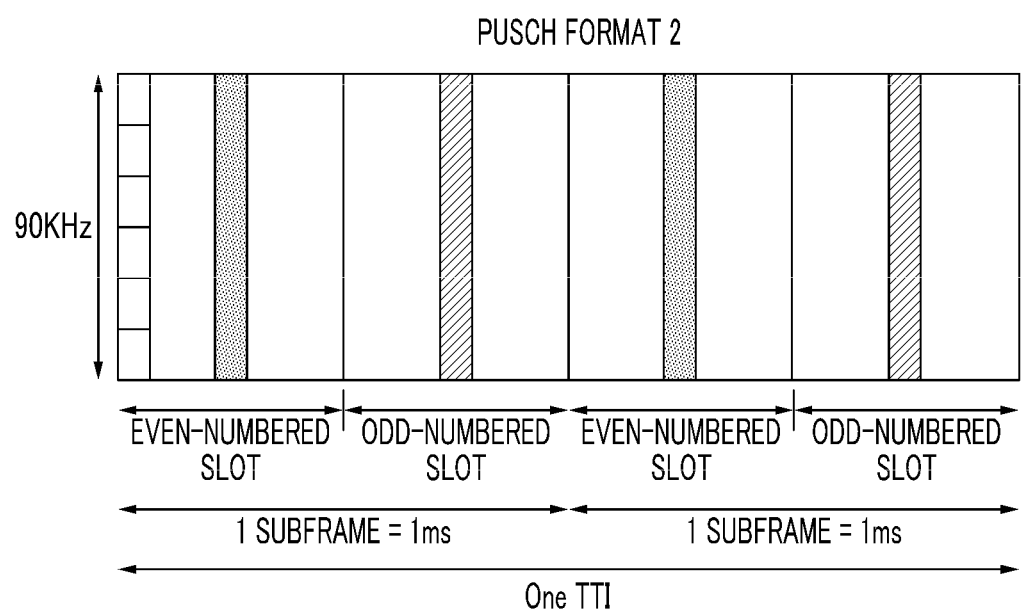
FIGS. 2 to 4 are views showing a channel structure for narrowband transmission according to an exemplary embodiment of the present invention.
Figure 3:
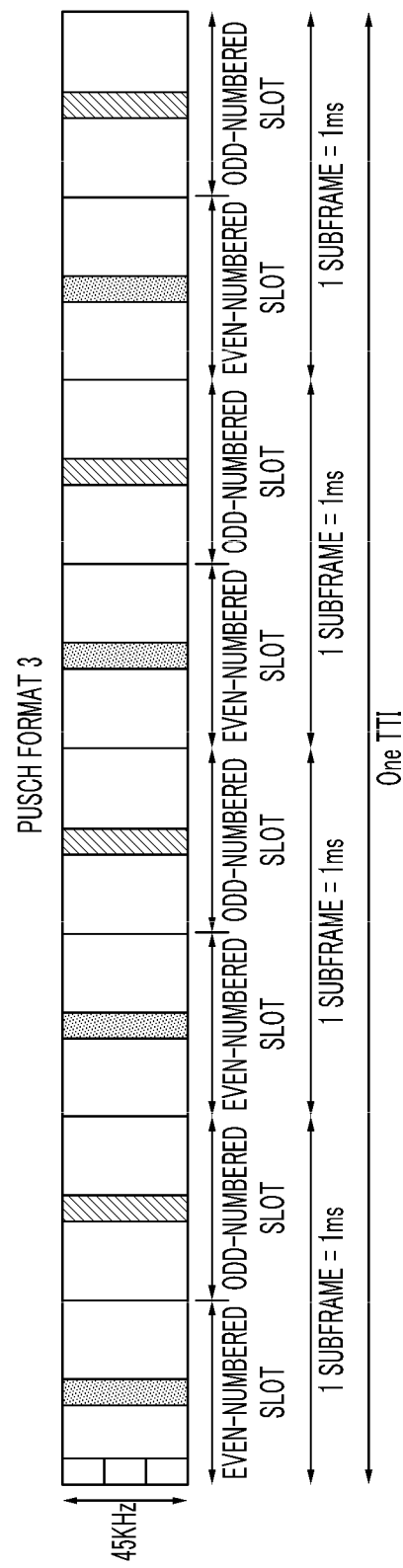
Figure 4:
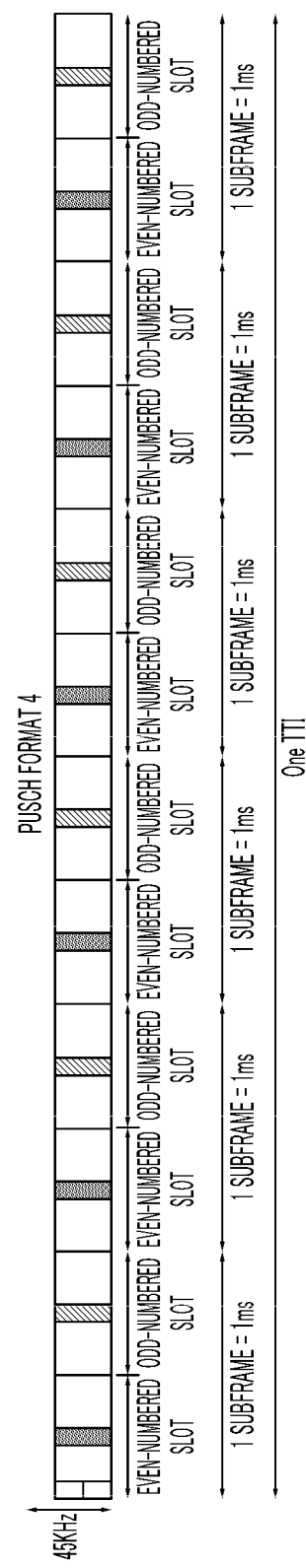

FIG. 1 is a view showing a channel structure for signal transmission in a wireless communication system. FIGS. 2 to 4 are views showing a channel structure for narrowband transmission according to an exemplary embodiment of the present invention. The figures illustrate a physical uplink shared channel (PUSCH) structure, which is a packet data channel for LTE-based uplink transmission.

As shown in the accompanying FIG. 1, the PUSCH for the existing radio interface operates on a per TTI basis, each TTI includes a subframe, and each subframe consists of two slots. Each slot includes a plurality of subcarriers and a plurality of orthogonal frequency division multiplexing (OFDM) symbols. The number of OFDM symbols included in one slot may vary depending on the length of a cyclic prefix (CP). In case of a normal CP, one slot includes 7 OFDM symbols, and in case of an extended CP, one slot includes 6 OFDM symbols. Each slot includes a total of 12 subcarriers with bandwidth of 15 kHz. In FIG. 1, a resource block (RS) consists of 12 subcarriers and 1 subframe.

In the exemplary embodiment of the present invention, narrowband transmission is performed using the PUSCH having the structure shown in the accompanying FIGS. 2 to 4, in order to maintain the same transport block size as the PUSCH for the existing radio interface which has the above-described structure.

Specifically, as shown in FIG. 2, each subframe of the PUSCH according to the exemplary embodiment of the present invention includes a plurality of slots, and each slot has 6 subcarriers for narrowband transmission, unlike the prior art. As each slot has only 6 subcarriers, the TTI period is doubled in the exemplary embodiment of the present invention, in order to make the transport block size equal to that for the existing radio interface (FIG. 1). Therefore, for narrowband transmission, the PUSCH has a TTI period corresponding to 2 subframes and also has 6 subcarriers, as shown in FIG. 2. That is, a resource block consists of half the number of subcarriers of the prior art and twice the number of subframes of the prior art.

When data is allocated in the PUSCH, data allocated for 6 subcarrier blocks on the lower side in the existing PUSCH shown in FIG. 1 may be allocated to the second subframe in the PUSCH having the structure shown in FIG. 2. Accordingly, it is possible to maintain as much compatibility with the resource allocation scheme for the existing radio interface as possible.

Meanwhile, the PUSCH shown in FIG. 3 can be implemented for narrowband transmission according to the exemplary embodiment of the present invention. As shown in the accompanying FIG. 3, each subframe of the PUSCH includes a plurality of slots, and each slot has 3 subcarriers for narrowband transmission, unlike the prior art. As each slot has only 3 subcarriers, the TTI period is increased by four times in the exemplary embodiment of the present invention, in order to make the transport block size equal to that for the existing radio interface (FIG. 1). Therefore, for narrowband transmission, the PUSCH has a TTI period corresponding to 4 subframes, and also has 6 subcarriers, as shown in FIG. 3. That is, a resource block consists of ¼ the number of subcarriers of the prior art and four times the number of subframes of the prior art.

When data is allocated in the PUSCH, data allocated to 3 subcarrier blocks on the lower side of each subframe in the PUSCH having the structure shown in FIG. 2 may be allocated to the third and fourth subframes in the PUSCH shown in FIG. 3, thereby maintaining as much compatibility with the existing LTE resource allocation scheme as possible.

Meanwhile, the PUSCH shown in FIG. 4 can be implemented for narrowband transmission according to the exemplary embodiment of the present invention. As shown in the accompanying FIG. 4, each subframe of the PUSCH includes a plurality of slots, and each slot has 2 subcarriers for narrowband transmission, unlike the prior art. As each slot has only 2 subcarriers, the TTI period is increased by six times in the exemplary embodiment of the present invention, in order to make the transport block size equal to that for the existing radio interface (FIG. 1). Therefore, for narrowband transmission, the PUSCH has a TTI period corresponding to 10 subframes, and also has 2 subcarriers, as shown in FIG. 4. That is, a resource block consists of ⅙ the number of subcarriers of the prior art and six times the number of subframes of the prior art.

When data is allocated in the PUSCH, data allocated to 1 subcarrier block on the lower side of each subframe in the PUSCH having the structure shown in FIG. 3 may be allocated to the fifth and sixth subframes in the PUSCH shown in FIG. 4, thereby maintaining as much compatibility with the resource allocation scheme for the existing radio interface as possible.

In the case of data transmission based on the PUSCH channel according to the exemplary embodiment of the present invention as described above, a receiving apparatus has a long TTI, and this offers the advantage of obtaining a diversity gain in a satellite channel that is more sensitive to time-selective fading than to frequency-selective fading.

Based on the above-described structure, a PUSCH for narrowband transmission which has 4 subcarriers and a TTI period corresponding to 3 subframes can be implemented.

In a variety of channel formats as described above, every operation performed at the existing radio interface for each TTI corresponding to the length of a subframe is performed for each TTI length corresponding to each format. If the format of the PUSCH according to the exemplary embodiment of the present invention shown in FIG. 2 is referred to as the first format, a subframe in the first format is a multiple of TTI, so an operation performed at the existing radio interface on a per subframe basis may be done as it was done.

Meanwhile, in FIG. 2 to FIG. 4, the reason why the number of subcarriers of the PUSCH suggested for narrowband transmission according to the exemplary embodiment of the present invention is 2, 3, 4, and 6 is because the number of subcarriers for the existing SC-OFDMA on which fast Fourier transform is performed is a multiple of 2, 3, and 5.

Figure 5:
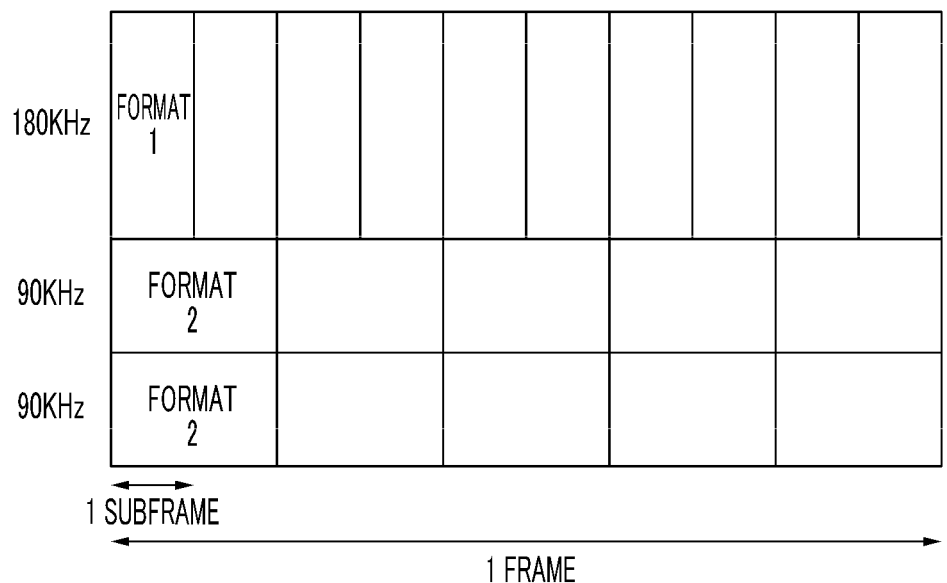
FIGS. 5 and 6 are views showing an overall frame structure according to the exemplary embodiment of the present invention.
Figure 6:
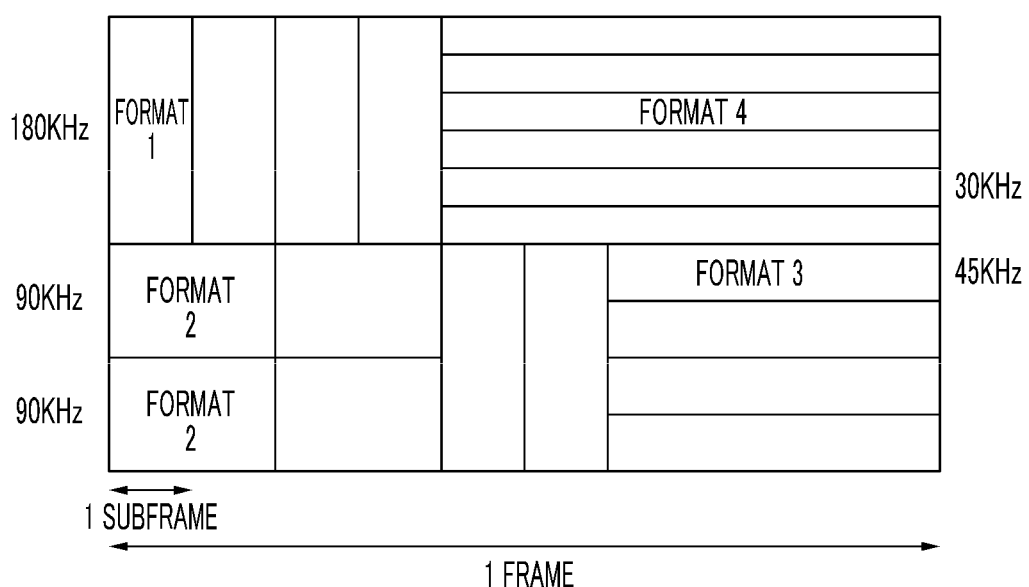

FIGS. 5 and 6 are views showing an overall frame structure according to the exemplary embodiment of the present invention. Particularly, the figures show an overall frame structure which uses both the existing PUSCH format and the PUSCH according to the exemplary embodiment of the present invention.

The exiting PUSCH format shown in FIG. 1 is referred to as a "format 1", the PUSCH format according to the exemplary embodiment of the present invention shown in FIG. 2 is referred to as a "format 2", the PUSCH format according to the exemplary embodiment of the present invention shown in FIG. 3 is referred to as a "format 3", and the PUSCH format according to the exemplary embodiment of the present invention shown in FIG. 4 is referred to as a "format 4".

Because a transport block for the existing radio interface is transmitted on a 180 kHz bandwidth basis, a transport block for narrowband transmission also has to be transmitted for each 180 kHz bandwidth to maintain compatibility with the existing radio interface. Therefore, when using a transport block having the format 2 according to the exemplary embodiment of the present invention which consists of half the subcarriers of the transport block having the existing format 1, 2 transport blocks each having the format 2 have to be transmitted in the transport block having the existing format 1. According to this principle, when using a transport block having the format 3, 4 transport blocks each having the format 3 are transmitted in the transport block of 180 kHz having the existing format 1, and when using a transport block having the format 4, 6 transport blocks each having the format 4 are transmitted in the transport block of 180 kHz having the existing format 1.

In a wireless communication system based on a satellite radio interface, given that the TTI period does not need to be set to 1 ms to reduce latency, as is the case with the ground, due to a long round-trip delay time, transport blocks of different formats can be used together within one frame, as shown in FIG. 6, by using a TTI as 1 frame period.

Meanwhile, a physical uplink control channel (PUCCH) for transmitting control information according to the exemplary embodiment of the present invention also has the same structure as the above-described PUSCH channel n.

Figure 7:
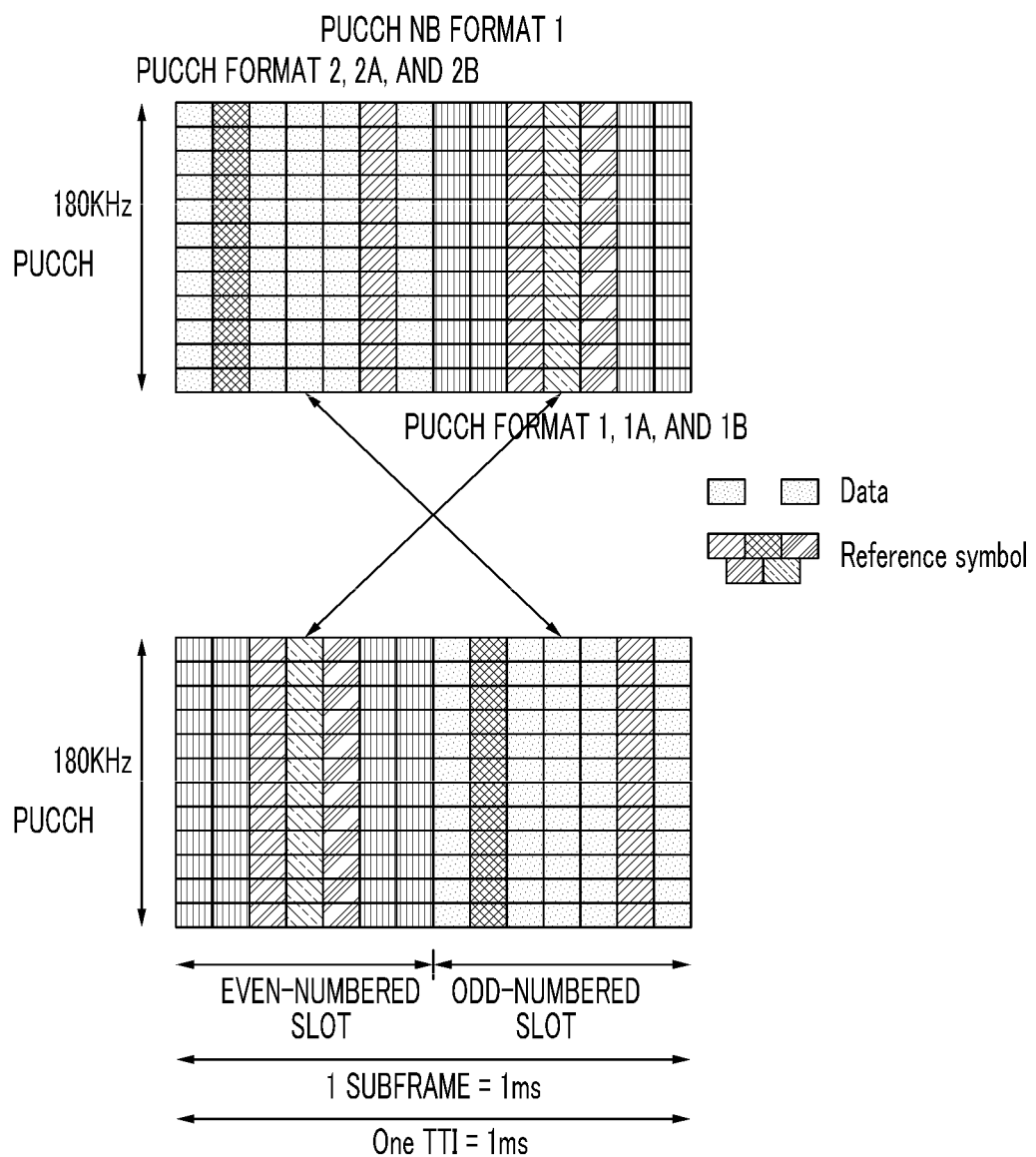
FIG. 7 is a view showing a PUCCH channel structure in a wireless communication system.

FIG. 7 is a view showing a PUCCH channel structure in a wireless communication system. FIGS. 8 to 11 are views showing a PUCCH channel structure for uplink narrowband transmission according to the exemplary embodiment of the present invention.

Like the above-described PUSCH, the PUCCH operates on a per TTI basis. One TTI includes a subframe, and each subframe consists of two slots. As shown in FIG. 7, the existing PUCCH transmits control information in units of resource blocks each consisting of 12 subcarriers and 1 subframe.

Figure 8:
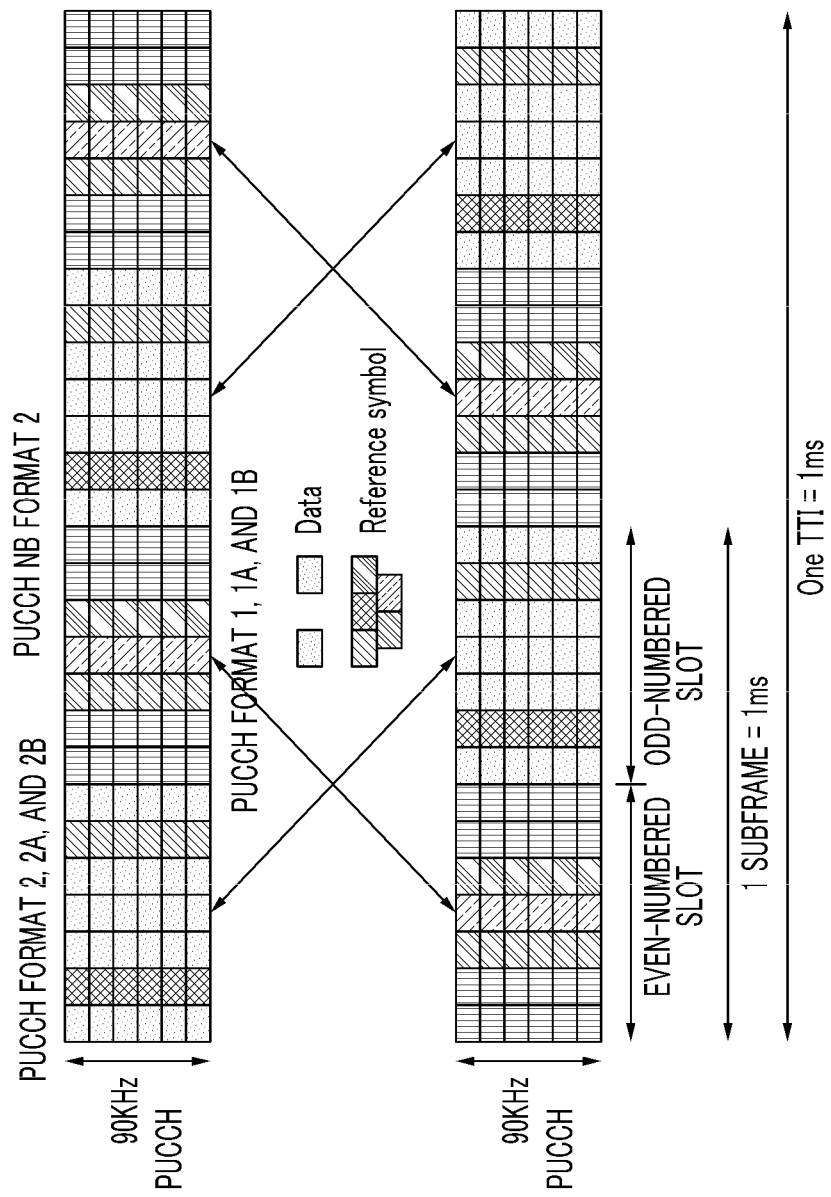
FIGS. 8 to 11 are views showing a PUCCH channel structure for uplink narrowband transmission according to the exemplary embodiment of the present invention.

In the exemplary embodiment of the present invention, as shown in FIG. 8, the PUCCH according to the exemplary embodiment of the present invention has a TTI period corresponding to 2 subframes and also has 6 subcarriers, in order to perform narrowband transmission while maintaining the same size as the PUCCH for the existing radio interface which has the above-described structure. That is, a resource block consists of half the number of subcarriers of the prior art and twice the number of subframes of the prior art.

When data is allocated in the PUCCH, data allocated to 6 subcarrier blocks on the lower side in the existing PUCCH shown in FIG. 7 may be allocated to the second subframe in the PUCCH having the structure shown in FIG. 8. Accordingly, it is possible to maintain as much compatibility with the resource allocation scheme for the existing radio interface as possible.

Figure 9:
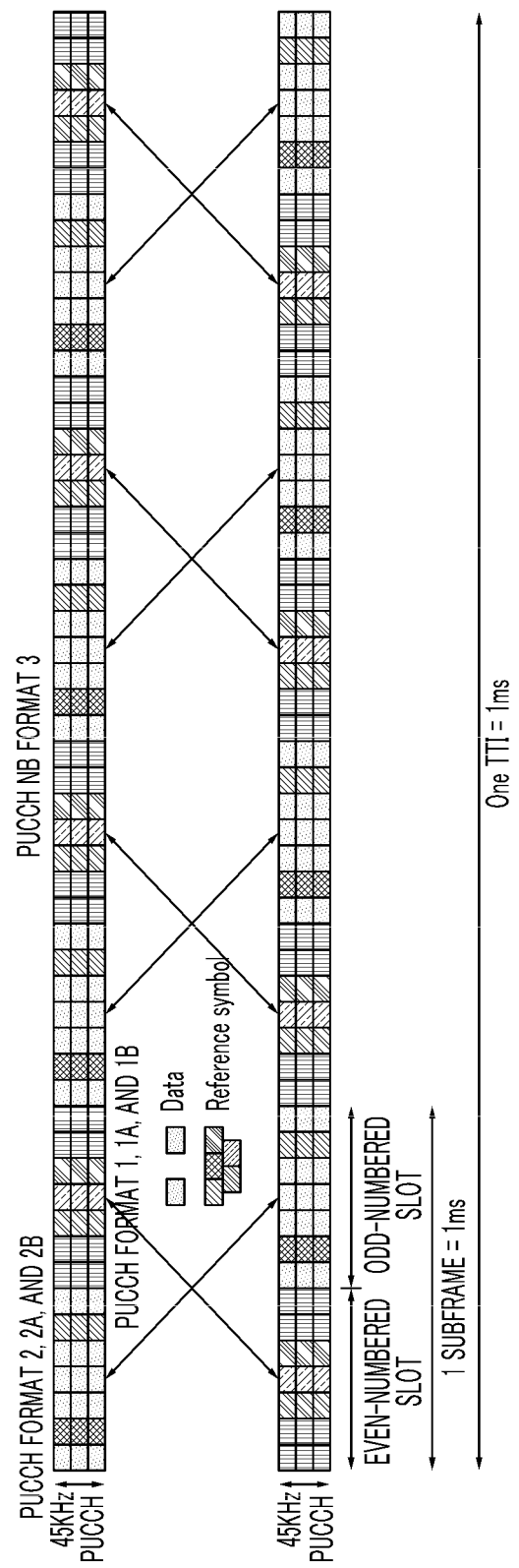

Meanwhile, the PUCCH shown in FIG. 9 can be implemented for narrowband transmission according to the exemplary embodiment of the present invention. As shown in the accompanying FIG. 9, the PUCCH according to the exemplary embodiment of the present invention has a TTI period corresponding to 4 subframes, and also has 6 subcarriers. That is, a resource block consists of ¼ the number of subcarriers of the prior art and four times the number of subframes of the prior art.

When data is allocated in the PUCCH, data allocated to 3 subcarrier blocks on the lower side of each subframe in the PUSCH having the structure shown in FIG. 8 may be allocated to the third and fourth subframes in the PUCCH shown in FIG. 9, thereby maintaining as much compatibility with the existing LTE resource allocation scheme as possible.

Figure 10:
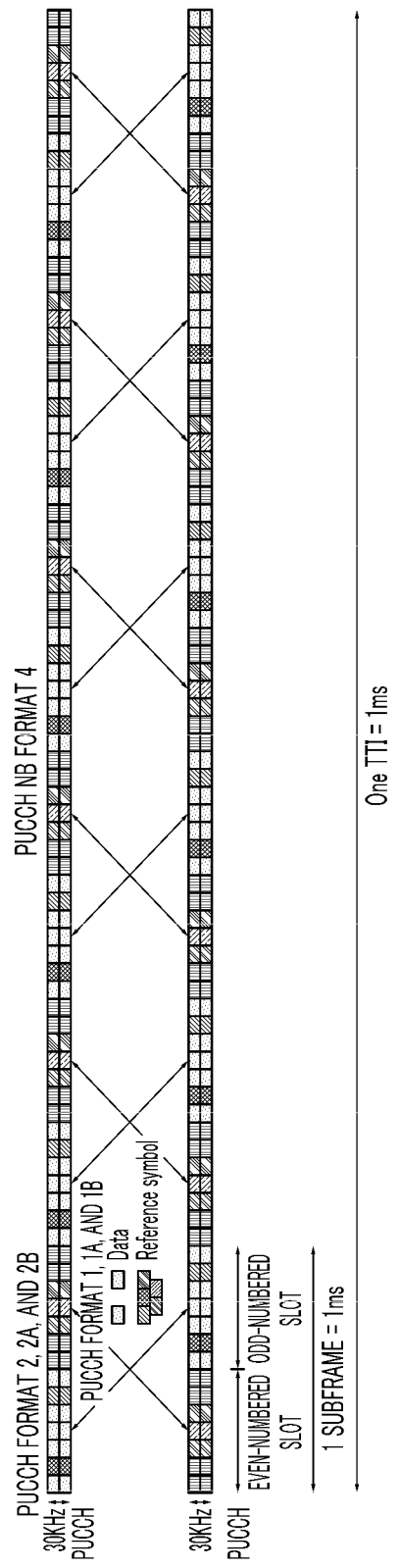

Meanwhile, the PUCCH shown in FIG. 10 can be implemented for narrowband transmission according to the exemplary embodiment of the present invention. As shown in the accompanying FIG. 9, the PUCCH according to the exemplary embodiment of the present invention has a TTI period corresponding to 10 subframes, and also has 2 subcarriers. That is, a resource block consists of ⅙ the number of subcarriers of the prior art and six times the number of subframes of the prior art.

When data is allocated in the PUCCH, data allocated to 1 subcarrier block on the lower side of each subframe in the PUCCH having the structure shown in FIG. 9 may be allocated to the fifth and sixth subframes in the PUCCH shown in FIG. 10, thereby maintaining as much compatibility with the resource allocation scheme for the existing radio interface as possible.

Based on the above-described structure, a PUCCH for narrowband transmission which has 4 subcarriers and a TTI period corresponding to 3 subframes can be implemented. The corresponding PUCCH structure is illustrated in FIG. 11.

Figure 11:
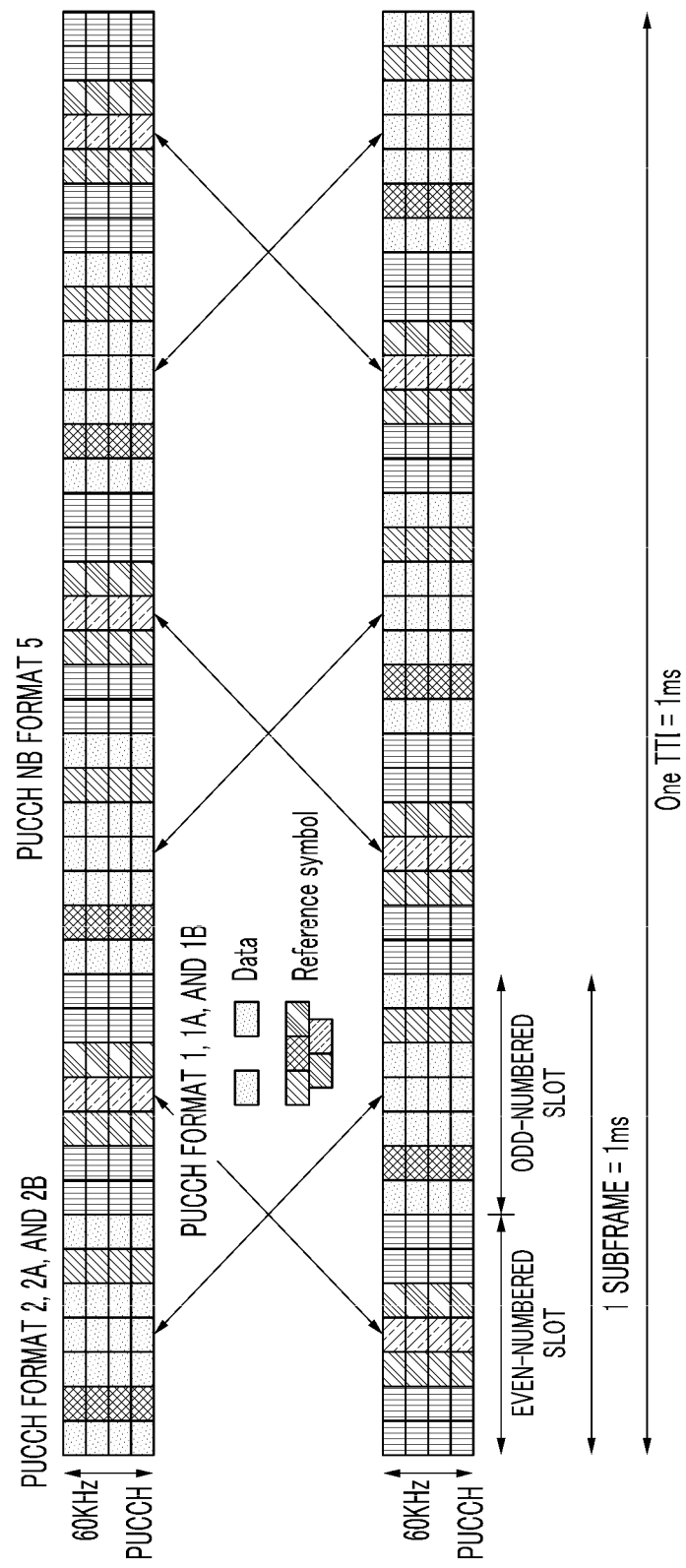

The exiting PUCCH format shown in FIG. 7 is referred to as a "format 1", the PUCCH format according to the exemplary embodiment of the present invention shown in FIG. 8 is referred to as a "format 2", the PUCCH format according to the exemplary embodiment of the present invention shown in FIG. 9 is referred to as a "format 3", the PUCCH format according to the exemplary embodiment of the present invention shown in FIG. 10 is referred to as a "format 4", and the PUCCH format according to the exemplary embodiment of the present invention shown in FIG. 11 is referred to as a "format 5".

In the case of data transmission based on the PUSCH channel according to the exemplary embodiment of the present invention as described above, a receiving apparatus has a long TTI, and this offers the advantage of obtaining a diversity gain in a satellite channel that is more sensitive to time-selective fading than to frequency-selective fading.

In a variety of channel formats as described above, every operation performed at the existing radio interface for each TTI corresponding to the length of a subframe is performed for each TTI length corresponding to each format.

Although FIGS. 7 to 11 have illustrated the PUCCH channel using a normal CP, the same principle may apply in the case of an extended CP, except that the number and positions of data transmission symbols and OFDM symbols carrying reference symbols within a transport block are different.

Like the above-described PUSCH, the PUCCH according to the exemplary embodiment of the present invention also may use both the existing PUCCH format and the PUCCH formats for narrowband according to the exemplary embodiment of the present invention. That is, in the same manner as the frame structure shown in FIGS. 5 and 6, the existing PUCCH format and the PUCCH formats for narrowband according to the exemplary embodiment of the present invention may be used simultaneously. However, PUSCH and PUCCH cannot be transmitted simultaneously from one terminal. Therefore, each terminal can transmit either one of a frame for PUSCH and a frame for PUCCH in a TTI interval, and can transmit a frame having a different structure in the next TTI interval.

If many resources are allocated to the PUCCH, the amount of resources for the PUSCH decreases, thereby resulting in a reduction in system capacity. For instance, the PUCCH channel for narrowband is used in the structure show in FIGS. 5 and 6, separately from the existing PUCCH channel, the same resource can be shared across existing PUCCH channels but PUCCH channels for narrowband have to be allocated, separately from the existing PUCCH channels. This may increase the amount of resources and therefore there is a possibility that overall system capacity will be reduced. Accordingly, in the exemplary embodiment of the present invention, the existing PUCCH channel and the PUCCH channel for narrowband according to the exemplary embodiment of the present invention share and use the same resource.

If the PUCCH has the format 1, there are seven OFDM symbols per slot for a normal CP. For each of those seven OFDM symbols, a sequence having a predetermined length is transmitted. Specifically, a length-12 sequence obtained by phase rotation of a cell-specific sequence is transmitted. A predetermined number (e.g., three) of symbols among the symbols is used as reference signals to enable channel estimation by a base station, and the remaining number (e.g., 4) of symbols is used to transmit actual information (e.g., ACK/NACK).

The symbols used for data transmission may be modulated based on binary phase shift keying/quadrature phase shift keying (BPSK/QPSK). In principle, a modulation symbol could directly modulate the phase-rotated length-12 sequence used to differentiate terminals transmitting on the same time-frequency resource. However, this would result in unnecessarily low capacity on the PUCCH because a PUCCH cannot contain much information. Therefore, in the exemplary embodiment of the present invention, the modulation symbol is multiplied by an orthogonal sequence (e.g., length-4 orthogonal sequence). Accordingly, multiple terminals may use the same phase-rotated sequence, and may simultaneously transmit on the same time-frequency resource as signals transmitted by the respective terminals are separated through different orthogonal sequences.

The reference signal used for channel estimation for the respective terminals also may employ an orthogonal sequence. A cover sequence used for the reference signal has a different length, so a length-2 sequence is used in the case of a normal CP. Thus, each cell-specific sequence can be used for up to 36 (3×12) different terminals.

Even when the PUCCH for narrowband according to the exemplary embodiment of the present invention is implemented in the format 2, the same radio resource can be used for a plurality of different terminals based on the phase rotation of the same cell-specific sequence.

By encoding and modulating information to be transmitted through the PUCCH (e.g., channel quality information, CQI), a predetermined number (e.g., 10) of modulation symbols (QPSK symbols) exist per subframe. Among these modulation symbols, the first five symbols are transmitted in the first slot, and the remaining five symbols are transmitted in the second slot. The symbols transmitted in each slot are multiplied by a phase-rotated cell specific sequence having a predetermined length (e.g., 12), and the resultant symbols are transmitted. As the terminals can be differentiated only through the phase-rotated sequence, a total of 12 terminals can share the same radio resource and transmit signals based on the length-12 phase-rotated sequence.

Meanwhile, in order to use the existing PUCCH channel and the PUCCH channel for narrow band according to the exemplary embodiment of the present invention in a shared manner, the orthogonality between the two channels has to be maintained to avoid interference between the two channels. To this end, the existing PUCCH channel uses one of the phase-rotated sequences available for a specific resource block. In a wireless communication system based on the existing radio interface, 12 PUCCH channels are made available by sharing a specific subframe, whereas only one existing PUCCH channel is transmitted if subframe sharing is used, as well as narrowband transmission. The PUCCH channel for narrowband is multiplied by the cell-specific sequence selected from the corresponding transport block by the existing PUCCH channel in the same manner as the existing PUCCH channel. Afterwards, to maintain the orthogonality between the existing PUCCH channel and the PUCCH channel for narrowband, the PUCCH channel for narrowband is multiplied by an orthogonal code (e.g., a Hadamard code) or a discrete Fourier transform (DFT) sequence. For better comprehension and ease of description, the orthogonal code and DFT sequence by which the PUCCH channel for narrowband is multiplied for orthogonality are collectively referred to as "orthogonal sequences".

For example, a PUCCH channel (format 4) for narrowband using two subcarriers uses either one of [1 −1] and [−1 1] orthogonal codes, and a PUCCH channel (format 5) for narrowband using four subcarriers uses one of [1 −1 1 −1], [−1 1 −1 1], [1 1 −1 −1], and [−1 −1 1 1] orthogonal codes. A PUCCH channel (format 3) for narrowband using three subcarriers uses one of three DFT sequences of length 3, and a PUCCH channel (format 2) for narrowband using six subcarriers uses one of six DFT sequences of length 6.

Therefore, in the case of the narrowband PUCCH channel using two subcarriers, two narrowband PUCCH channels can share the same transport block. In the case of the narrowband PUCCH channel using three subcarriers, three narrowband PUCCH channels can share the same transport block, and in the case of the narrowband PUCCH channel using four subcarriers, four narrowband PUCCH channels can share the same transport block. In the case of the narrowband PUCCH channel using six subcarriers, six narrowband PUCCH channels can share the same transport block. Accordingly, given twelve subcarriers having the transport block size for the existing radio interface, the existing PUCCH channels using 12 different subcarriers can share the same transport block. However, when attempting to transmit channels for narrowband transmission through the same resource as in the exemplary embodiment of the present invention, though only one PUCCH channel for the existing radio interface can be used, twelve PUCCH channels for narrowband can be used, whereby a total of 13 PUCCH channels can be transmitted.

Figure 12:
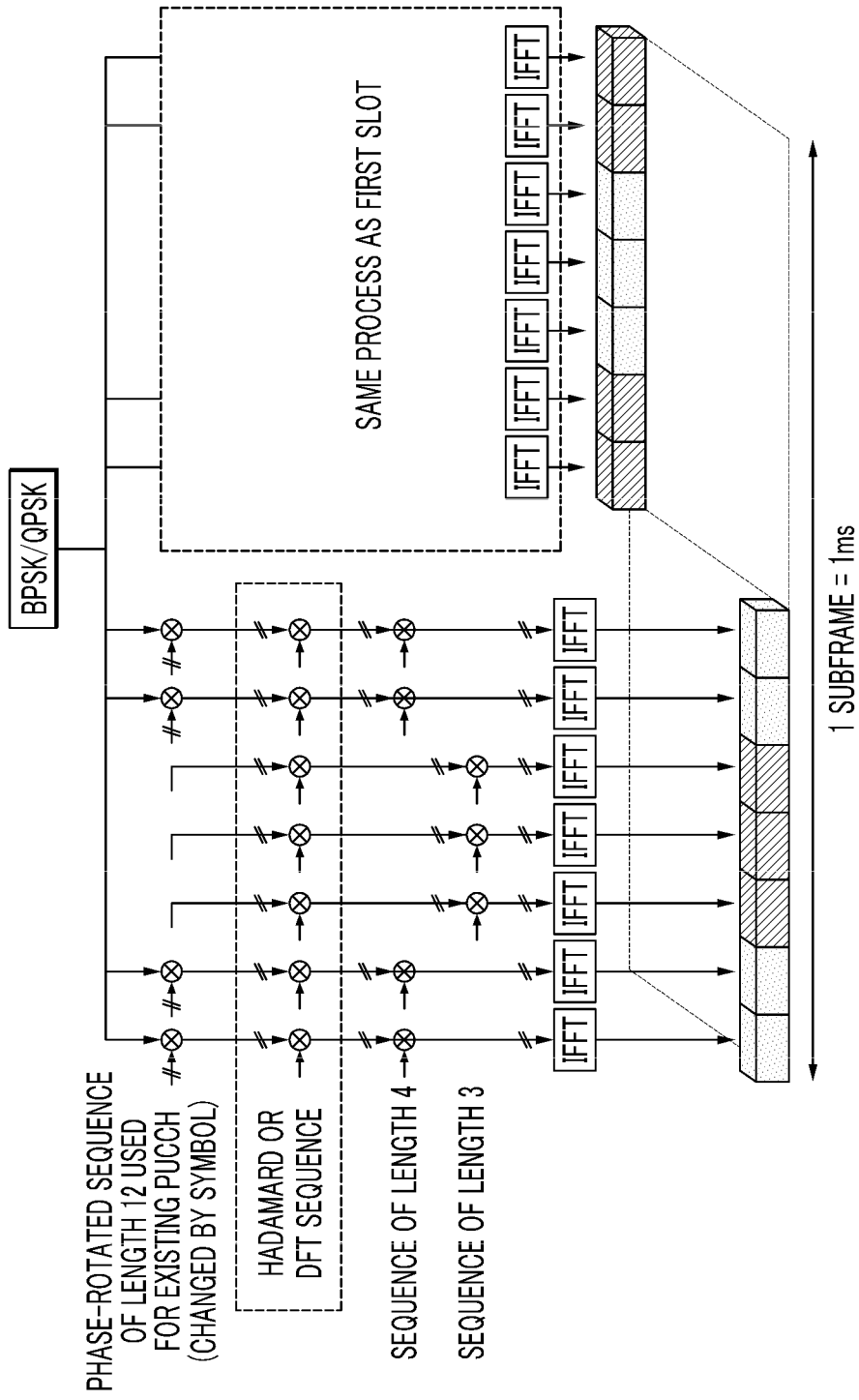
FIG. 12 is a view showing a process for generating a signal transmitted through the PUCCH channel having the format 1 in order to share a transport block according to the exemplary embodiment of the present invention.
Figure 13:
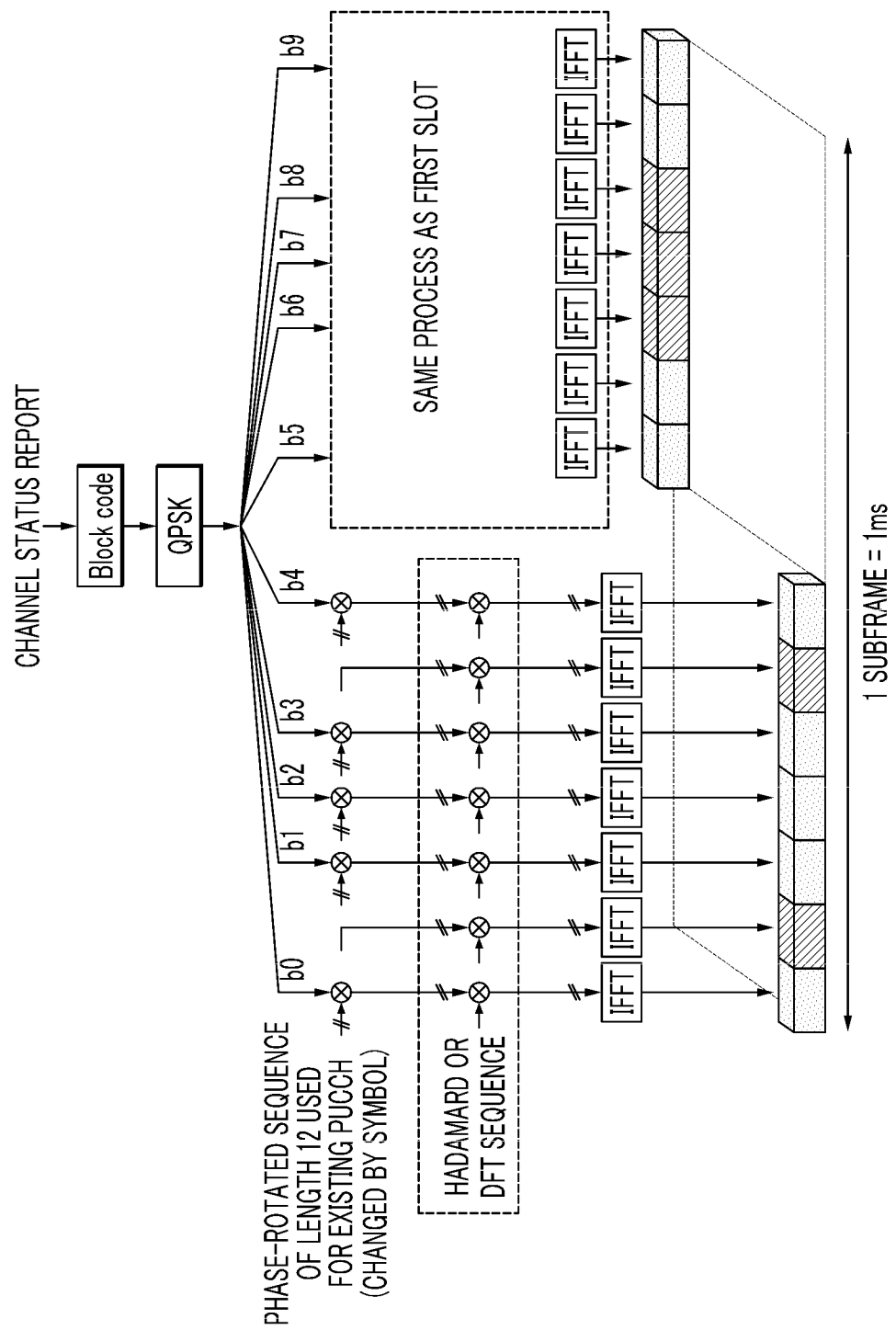
FIG. 13 is a view showing a process for generating a signal transmitted through the PUCCH channel having the format 2.

FIG. 12 is a view showing a process for generating a signal transmitted through the PUCCH channel having the format 1 in order to share a transport block according to the exemplary embodiment of the present invention, and FIG. 13 is a view showing a process for generating a signal transmitted through the PUCCH channel having the format 2.

For example, if the existing PUCCH channel has the same structure as the format 1, when attempting to transmit a data signal "b0" to a specific OFDM symbol, a length-12 phase-rotated sequence $c_i$ (i=0 through 11) is applied to this signal, and the following signal $d_i$ (i=0 through 11) is generated and allocated to each subcarrier.

$$d_i = b_0 \times c_i \quad \text{[Equation 1]}$$

For example, the signal $d_1$ is allocated to the first subcarrier, and the signal $d_2$ is allocated to the second subcarrier.

When attempting to transmit data "n0" to OFDM symbols through the PUCCH channel for narrowband, first of all, the sequence $c_i$ corresponding to the index of a subcarrier to which the PUCCH channel for narrowband is allocated, among the sequences $c_i$ used for the existing PUCCH channel, is multiplied by the corresponding signal, in order to share a transport block with the existing PUCCH channel. That is, if the index of a subcarrier to which the PUCCH channel for narrowband is allocated is the third one of 12 subcarriers, the sequence $c_3$ corresponding to i=3 is selected from the sequences $c_i$ (i=0~11) and multiplied by the signal.

Based on this, the process for generating a signal to be transmitted will be described more concretely. For example, if a PUCCH channel for narrowband using two subcarriers uses the first two of 12 subcarriers of a resource block to be shared, the sequences $c_i$ (i=0,1) corresponding to the indexes of the corresponding subcarriers, among the length-12 phase-rotated sequences $c_i$ (i=0 through 11), are applied to the signal n0 to be transmitted, thereby generating an intermediate transmission signal $e_i = n_0 \times c_i$ (i=0, 1). Also, an orthogonal sequence $g_i$ is applied for orthogonality with the existing channel. In the case of two subcarriers, either one of Hadamard codes [1 −1] or [−1 1] is used as the orthogonal sequence $g_i$. For example, $g_0=1$ and $g_1=-1$ or $g_0=-1$ and $g_1=1$ can be selected.

The selected orthogonal sequence $g_i$ is applied to $e_i = n_0 \times c_i$ (i=0, 1), respectively, to generate a final transmission signal $f_i = e_i \times g_i$ (i=0, 1) and allocate it to the corresponding subcarriers, respectively. That is, if $g_0=1$ and $g_1=-1$ are selected as the orthogonal sequence, $f_1$, multiplied by −1, is allocated and transmitted to the subcarrier corresponding to i=1. At this point, if a different orthogonal sequence $g_0=-1$ and $g_1=1$ is selected in a different PUCCH channel for narrowband, $f_1$, multiplied by 1, is allocated and transmitted to the subcarrier corresponding to i=1. In this way, different PUCCH channels for narrowband can transmit data by the same subcarrier while maintaining orthogonality. Therefore, data can be transmitted through a plurality of PUCCH channels in narrowband every narrowband transmission block within the transport block used by the existing PUCCH channel.

On the other hand, if a PUCCH channel for narrowband using three subcarriers uses the first three of 12 subcarriers of a resource block to be shared, $ei=n0 \times ci$ ($i=0, 1, 2$) is generated in the same manner as above. Also, an orthogonal sequence gi is applied for orthogonality with the existing channel. Here, a DFT sequence of length 3 is used as the orthogonal sequence and applied to $ei=no \times ci$ ($i=0, 1, 2$), respectively, thereby generating a signal $fi=ei \times gi$ ($i=0, 1, 2$). Also, the generated $fi=ei \times gi$ ($i=0, 1, 2$) is allocated and transmitted to the subcarriers having the corresponding indexes, respectively.

Moreover, if a PUCCH channel for narrowband using four subcarriers uses the first four of 12 subcarriers of a resource block to be shared, $ei=n0 \times ci$ ($i=0, 1, 2, 3$) is generated in the same manner as above. Also, an orthogonal sequence gi is applied for orthogonality with the existing channel. Here, one of Hadamard codes [1 1 −1 −1], [−1 −1 1 1], [1 −1 1 −1], and [−1 1 −1 1] is used as the orthogonal sequence and applied to $ei=n0 \times ci$ ($i=0, 1, 2, 3$), thereby generating $fi=ei \times gi$ ($i=0, 1, 2, 3$) and allocating it to the corresponding subcarriers.

Moreover, if a PUCCH channel for narrowband using six subcarriers uses the first six of 12 subcarriers of a resource block to be shared, $ei=n0 \times ci$ ($i=0, \ldots, 5$) is generated in the same manner as above. Also, an orthogonal sequence gi is applied for orthogonality with the existing channel. Here, a DFT sequence of length 6 is used as the orthogonal sequence and applied to $ei=n0 \times ci$ ($i=0, 1, 2, 3, 4, 5$), thereby generating $fi=ei \times gi$ ($i=0, 1, \ldots, 5$) and allocating it to the corresponding subcarriers.

By these processes, data can be transmitted through a plurality of narrowband PUCCH channels in every narrowband transport block within the transport block used by the existing PUCCH channel. For example, a narrowband channel using two subcarriers, a narrowband channel using three subcarriers, and a narrowband channel using four subcarriers can simultaneously transmit two channels, three channels, and four channels, respectively, within the same transport block.

The order of performing the process for multiplying a signal to be transmitted by a length-12 phase-rotated sequence and the process for multiplying the signal by an orthogonal sequence (Hadamard code or DFT sequence) to achieve the orthogonality of a shared resource block can be inversed. That is, an orthogonal sequence gi is first applied to the signal n0 to be transmitted to generate $ei=n0 \times gi$ (e.g., $i=0, 1$), and then two values (e.g., $i=0, 1$) corresponding to the indexes of subcarriers for signal transmission, among the phase-rotated sequences ci of length 12, can be applied to the signal ei.

In the existing PUCCH transport block, different narrowband PUCCH channels can be allocated to other subcarriers than the subcarriers to which the narrowband PUCCH channels are allocated as above by using the same principle. For example, in the case of a narrowband PUCCH using two subcarriers, two narrowband PUCCH channels may be allocated by using two subcarriers, and then 10 different narrowband PUCCH channel signals may be allocated as above to the remaining 10 subcarriers within the existing PUCCH transport block. Moreover, in the case of a narrowband PUCCH using three subcarriers, three narrowband PUCCH channels may be allocated by using three subcarriers, and then 9 different narrowband PUCCH channel signals may be allocated as above to the remaining 9 subcarriers within the existing PUCCH transport block. Moreover, in the case of a narrowband PUCCH using four subcarriers, four narrowband PUCCH channels may be allocated by using four subcarriers, and then 8 different narrowband PUCCH channel signals may be allocated as above to the remaining 8 subcarriers within the existing PUCCH transport block. Moreover, in the case of a narrowband PUCCH using six subcarriers, six narrowband PUCCH channels may be allocated by using six subcarriers, and then 6 different narrowband PUCCH channel signals may be allocated as above to the remaining 6 subcarriers within the existing PUCCH transport block.

Next, a signal transmission method according to the exemplary embodiment of the present invention will be described based on the above procedure.

Figure 14:
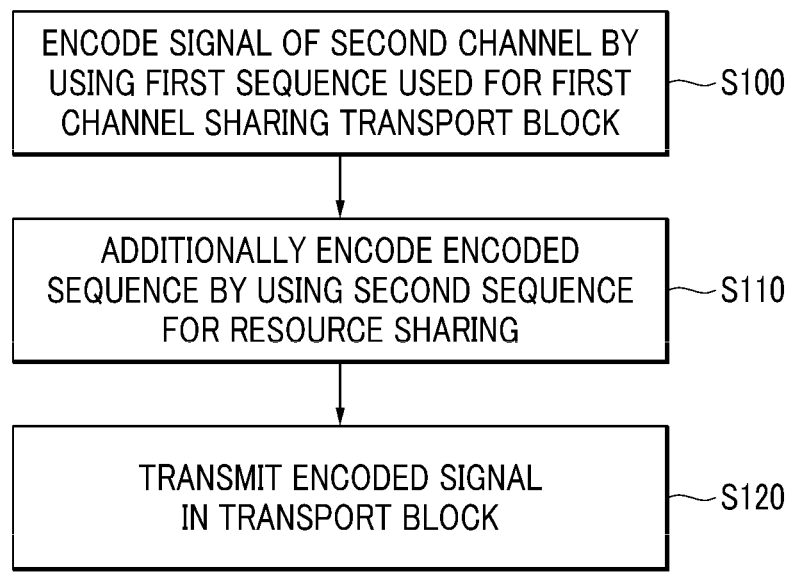
FIG. 14 is a flowchart of a signal transmission method according to the exemplary embodiment of the present invention.

FIG. 14 is a flowchart of a signal transmission method according to the exemplary embodiment of the present invention. Particularly, FIG. 14 shows a method for transmitting a signal through a narrowband PUCCH channel by sharing a transport block used by the existing PUCCH channel without interference.

As shown in the accompanying FIG. 14, first of all, when attempting to transmit an uplink signal by a radio resource consisting of transport blocks each including a predetermined number (12) of subcarriers and a predetermined number (2) of slots, data to be transmitted is modulated to generate a plurality of OFDM symbols.

When attempting to transmit a first data signal to an OFDM symbol through the existing PUCCH channel, the first data signal is encoded by multiplying the signal with phase-rotated sequences of a predetermined length (e.g., 12). Also, the encoded first data signal is allocated to the respective subcarriers of the corresponding resource block.

When attempting to transmit a second data signal through a narrowband PUCCH channel (also referred to as the second channel) by using the OFDM symbol used for transmission of the first data signal while sharing the same resource as the existing PUCCH channel (also referred to as the first channel), the second data signal is encoded by multiplying the signal by the sequences (hereinafter referred to as first sequences) corresponding to the indexes of the subcarriers used by the corresponding narrowband PUCCH channel, among the phase-rotated sequences of a predetermined length (e.g., 12), thereby generating an intermediate transmission signal. Such a second data signal encoding process can be referred to as the first encoding process (S100).

The second encoding process is performed by multiplying the signal generated according to the first encoding process by an orthogonal sequence for resource sharing (S120). Specifically, a plurality of orthogonal sequences (hereinafter referred to as second sequences) are applied to the intermediate transmission signal generated according to the first encoding process to generate a final transmission signal, and the generated final transmission signal is allocated to the corresponding subcarrier. Accordingly, data can be transmitted through a plurality of narrowband PUCCH channels in every narrowband transport block.

The signals allocated to the respective subcarriers are converted by inverse FFT (IFFT) and then transmitted (S130).

For such data transmission, the second sequences, instead of the first sequences, may be used in the first encoding process, and the first sequences, instead of the second sequences, may be used in the second encoding process. That is, the order of using the first sequences and the second sequences can be reversed.

By the above-described procedure, in a resource block, the first data signal can be transmitted through an existing PUCCH channel, and the second data signal can be transmitted through a plurality of narrowband PUCCH channels. Moreover, data can be transmitted through a plurality of narrowband PUCCH channels in every narrowband transport block within the transport block used by the existing PUCCH channel.

Once a signal is transmitted by the above-described procedure, the receiving apparatus is able to receive the signal by the following procedure.

Figure 15:
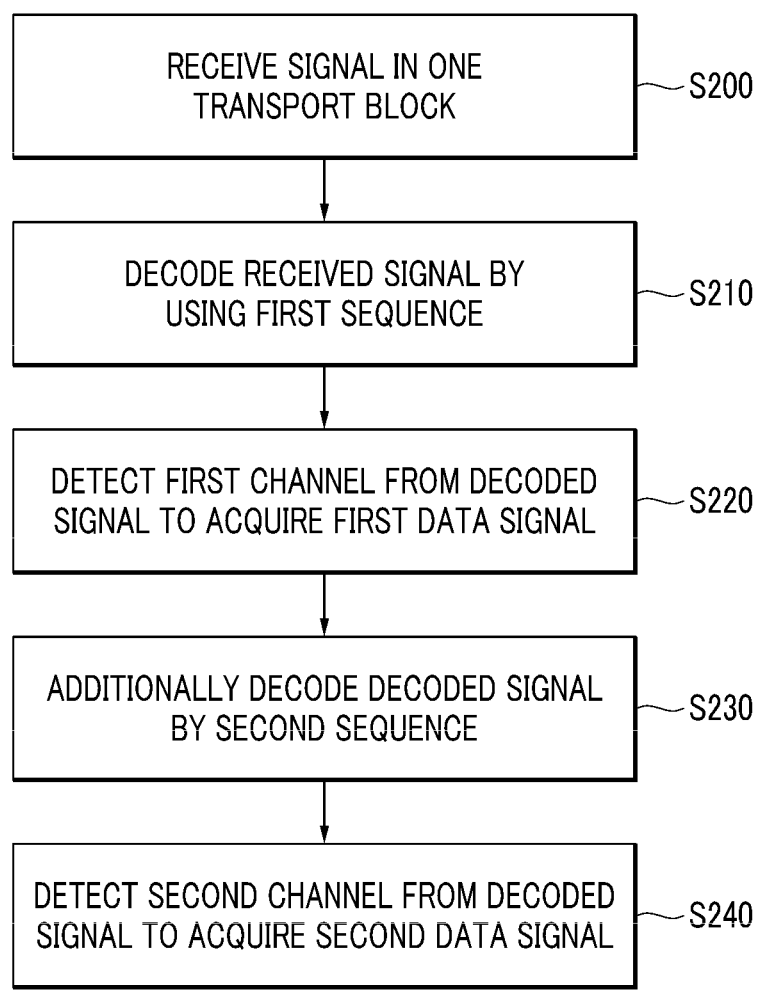
FIG. 15 is a flowchart of a signal reception method according to the exemplary embodiment of the present invention.

FIG. 15 is a flowchart of a signal reception method according to the exemplary embodiment of the present invention.

As shown in the accompanying FIG. 15, the receiving apparatus (not shown) receives a signal transmitted in a transport block (S200), and decodes the received signal by using a phase-rotated sequence of length 12 (S210). Also, an existing PUCCH channel signal is detected from the decoded signal to acquire a first data signal (S220).

Through the same resource block, decoding is performed for every resource block for narrowband PUCCH by using an orthogonal sequence (S230). That is, the signal decoded using the length-12 phase-rotated sequence is decoded using an orthogonal sequence. A signal decoded for each resource block for narrowband PUCCH is detected from the decoded signal to acquire a second data signal (S240).

According to the exemplary embodiment of the present invention, for uplink transmission having limitations in transmission power, like in a mobile terminal, in a wireless communication system based on a satellite radio interface, power allocated per subcarrier can be easily increased without changing the size of a basic transport block of an uplink radio resource. By such narrowband transmission, it is possible to support a high data rate while maintaining compatibility with the existing satellite radio interface.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting a signal through an uplink radio resource consisting of resource blocks each comprising a plurality of subcarriers, the method comprising: if a first data signal of a first channel is transmitted in a resource block, encoding a second data signal of a second channel by using a first sequence; additionally encoding the second data signal of the second channel encoded using the first sequence by using a second sequence; and transmitting the additionally encoded second data signal in the resource block, wherein a resource block of the radio resource comprises a first number of subcarriers and a second number of subframe having a first size, and the second channel, which is a narrowband transmission channel, is formed based on a resource block comprising fewer subcarriers than the first number and more subframes than the second number, wherein, if the first number is 12 and the second number is 1, the number of subcarriers of a resource block for the narrowband transmission channel is one of 2, 3, and 6, and the number of subframes of the resource block for the narrowband transmission channel is one of 6, 4, and 2 that correspond to the numbers of subcarriers 2, 3, and 6, respectively.

2. The method of claim 1, wherein the first sequence is a phase-rotated sequence of a first length used for transmission of the first data signal, and the second sequence is an orthogonal sequence for transmission in the same resource block as the resource block used for the first channel.

3. The method of claim 1, wherein the first sequence is an orthogonal sequence for transmission in the same resource block as the resource block used for the first channel, and the second sequence is a phase-rotated sequence of a first length used for transmission of the first data signal.

4. The method of claim 2, wherein the first length of the phase-rotated sequence used for transmission of the first data signal corresponds to the number of subcarriers included in the resource block, and
the second data signal is encoded by multiplying the second data signal by a sequence corresponding to an index of a subcarrier used by the second channel, among phase-rotated sequences of the first length.

5. The method of claim 2, wherein the orthogonal sequence is a Hadamard code or a discrete Fourier transform (DFT) sequence.

6. The method of claim 1, wherein, if the second channel uses two subcarriers, 6 second channels are transmitted in the resource block corresponding to the first channel, if the second channel uses 3 subcarriers, 4 second channels are transmitted in the resource block corresponding to the first channel, if the second channel uses 4 subcarriers, 3 second channels are transmitted in the resource block corresponding to the first channel, and if the second channel uses 6 subcarriers, 2 second channels are transmitted in the resource block corresponding to the first channel.

7. A method for receiving a signal through an uplink radio resource consisting of resource blocks each comprising a plurality of subcarriers, the method comprising: if first resource blocks of the radio resource each comprise a first number of subcarriers and a second number of subframe having a first size, forming second resource blocks each comprising fewer subcarriers than the first number and more subframes than the second number based on the first resource blocks; and transmitting a signal in a first resource block or a second resource block, wherein, if the first number of the first resource block is 12 and the second number of the first resource block is 1, the number of subcarriers of the second resource block is one of 2, 3, and 6, and the number of subframes of the second resource block is one of 6, 4, and 2 that correspond to the numbers of subcarriers 2, 3, and 6, respectively.

8. The method of claim 7, wherein a transmission frame comprises the first resource block and the second resource block.

9. The method of claim 7, wherein
a signal of a first channel is transmitted in the first resource block, and
a signal of a second channel for narrowband transmission is transmitted in the second resource block.

10. The method of claim 7, wherein a signal of a first channel and a signal of a second channel are transmitted in the first resource block.

11. The method of claim 10, wherein,
if a first data signal of the first channel is transmitted through the first resource block, a second data signal of the second channel is encoded by using a first sequence;
the second data signal of the second channel encoded using the first sequence is additionally encoded by using a second sequence; and
the additionally encoded second data signal is transmitted in the first resource block.

12. The method of claim 11, wherein the first sequence is a phase-rotated sequence of a first length used for transmission of the first data signal, and the second sequence is an orthogonal sequence for transmission in the first resource block.

13. The method of claim 11, wherein the first sequence is an orthogonal sequence for transmission in the first resource block, and the second sequence is a phase-rotated sequence of a first length used for transmission of the first data signal.

14. The method of claim 12, wherein
the first length of the phase-rotated sequence used for transmission of the first data signal corresponds to the number of subcarriers included in the resource block, and
the second data signal is encoded by multiplying the second data signal by a sequence corresponding to an index of a subcarrier used by the second channel, among phase-rotated sequences of the first length.

15. The method of claim 7, wherein when transmitting a signal of a first channel and a signal of a second channel for narrowband transmission, if the second channel uses 2 subcarriers, 6 second channels are transmitted in the first resource block, if the second channel uses 3 subcarriers, 4 second channels are transmitted in the first resource block, if the second channel uses 4 subcarriers, 3 second channels are transmitted in the first resource block, and if the second channel uses 6 subcarriers, 2 second channels are transmitted in the first resource block.

16. A method for receiving a signal through an uplink radio resource consisting of resource blocks each comprising a plurality of subcarriers, the method comprising:
 decoding a data signal received in a resource block by using a first sequence;
 detecting a first channel from the signal encoded using the first sequence to acquire a first data signal;
 decoding the signal decoded using the first sequence by using a second sequence; and
 detecting a second channel from the signal decoded using the second sequence to acquire a second data signal.

17. The method of claim 16, wherein the first sequence is a phase-rotated sequence of a first length used for transmission of the first data signal, and the second sequence is an orthogonal sequence for transmission of the second data signal in the resource block.

* * * * *